United States Patent [19]
Schweninger

[11] Patent Number: 6,161,849
[45] Date of Patent: Dec. 19, 2000

[54] TURN WHEEL LOCKING DEVICE

[76] Inventor: Q. David Schweninger, 3214 Honolulu Ave., La Crescenta, Calif. 91209

[21] Appl. No.: 09/286,315

[22] Filed: Apr. 5, 1999

Related U.S. Application Data

[63] Continuation-in-part of application No. 09/163,109, Sep. 29, 1998.

[51] Int. Cl.$^7$ .................................................. B62D 39/00
[52] U.S. Cl. ............................... 280/33.994; 280/33.991; 280/33.992; 188/17; 188/19; 16/18 R; 16/35 R
[58] Field of Search ..................... 280/33.994, 33.991, 280/33.992; 188/19, 17; 16/18 R, 35 R

[56] References Cited

U.S. PATENT DOCUMENTS

| | | |
|---|---|---|
| 4,591,175 | 5/1986 | Upton et al. ....................... 280/33.994 |
| 4,772,880 | 9/1988 | Goldstein et al. ...................... 340/571 |
| 5,194,844 | 3/1993 | Zelda ....................................... 340/426 |
| 5,315,290 | 5/1994 | Moreno et al. .......................... 340/568 |
| 5,357,182 | 10/1994 | Wolfe et al. ............................ 318/379 |
| 5,598,144 | 1/1997 | Lace ........................................ 340/568 |
| 5,806,862 | 9/1998 | Merryman et al. ................. 280/33.994 |
| 5,823,302 | 10/1998 | Schweninger ........................... 188/111 |
| 5,831,530 | 11/1998 | Lace et al. ............................ 340/568.5 |

Primary Examiner—Brian L. Johnson
Assistant Examiner—Deanna Draper
Attorney, Agent, or Firm—James E. Brunton

[57] ABSTRACT

A turn wheel locking device for use with shopping carts having at least one turn wheel. The locking device functions to automatically disable the cart when it is removed from a prescribed area by locking the turn wheel in a turned configuration so that the cart can travel only along a generally circular path.

19 Claims, 13 Drawing Sheets

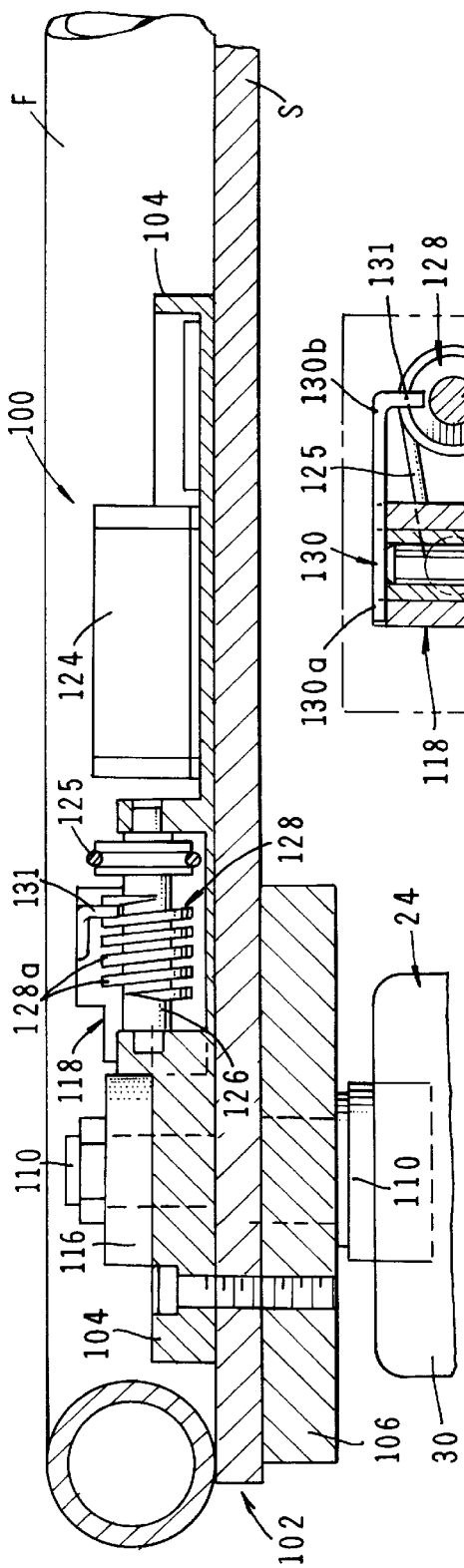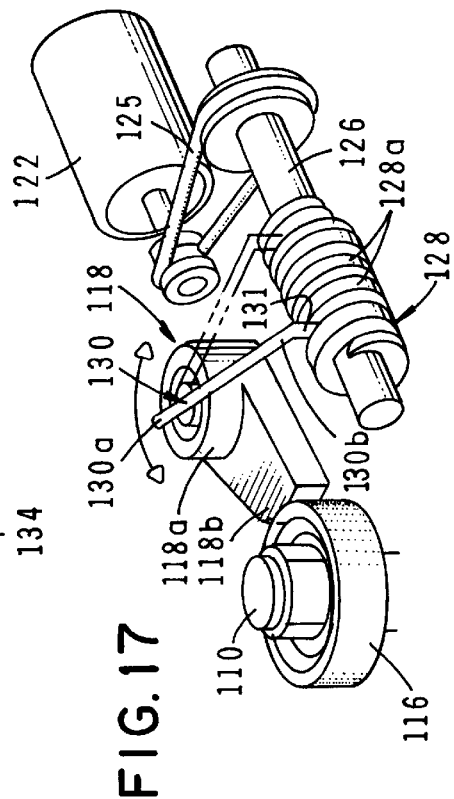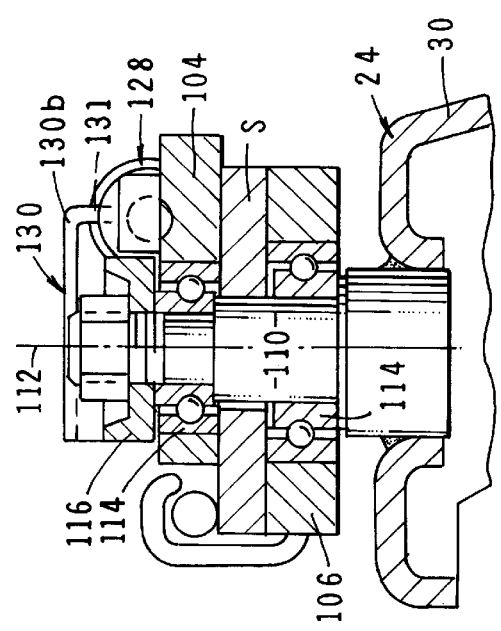

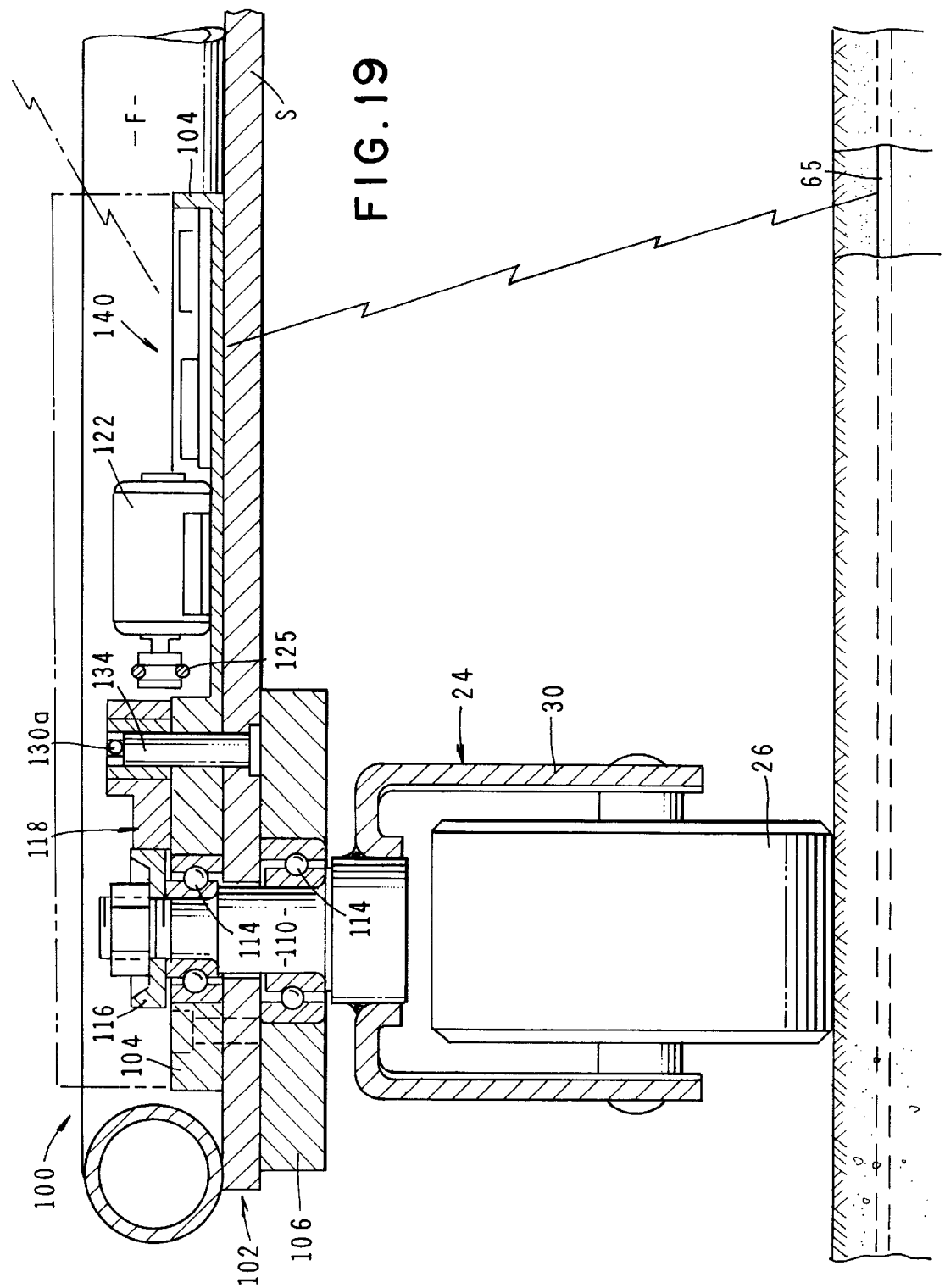

to US Pat. No. 6,161,849

TURN WHEEL LOCKING DEVICE

This is a Continuation-In-Part application of co-pending U.S. Ser. No. 09/163,109 filed Sep. 29, 1998.

BACKGROUND OF THE INVENTION

1. Field of the Invention

The present invention relates generally to wheel locking devices. More particularly, the invention concerns a locking device for locking turn wheels of the type used on vehicles such as grocery shopping carts in a manner such that the turn wheel is releasably locked in a vehicle turning configuration.

2. Discussion of the Invention

Turning wheels are widely used in connection with various types of push carts, including grocery carts. The turn wheels, which are typically swivelly mounted proximate the front of the cart frame, function to facilitate turning and easy maneuvering of the cart. More particularly, the typical grocery cart includes a pair of rear wheels mounted for rotation on the rear of the cart frame, typically at laterally opposite sides of the cart. Similarly, the laterally spaced front turn wheels of the carts are mounted for rotation on either side of the frame for rotation about both horizontal and vertical axis.

Retail outlets such as grocery stores, shopping malls, hardware stores and garden centers generally use large numbers of shopping carts to facilitate handling and transport of goods by customers to and from check out points and to parked vehicles. Since these carts are typically subjected to rough handling by the customers, they are durably made of relatively expensive materials such as stainless steel, chrome steel and the like and each cart may cost $150.00 or more.

Because of the very large number of carts used in a single area, such as a shopping mall, and because of the large volume of business that is conducted in these areas, it is usually a very simple matter for a customer to remove a cart from the premises without being detected. In fact, the large number of carts misappropriated each year represents a significant factor in the overhead of those retail outlets which own the carts.

By way of example, in California alone, the Grocers Association estimates that some 750,000 carts are loose on California streets at any given time. Statistics show that losses due to cart misappropriation costs grocery stores alone about $17 million a year. The carts may be taken by customers who use them to wheel their purchases home, or to remotely parked vehicles and then fail to return them, or they may be misappropriated by vagrants who use them to hold and transport their possessions. The problem has become so serious in recent years that businesses have been created expressly for locating, retrieving and returning shopping carts that have been removed from retail establishments.

Because of the substantial problems involved in the misappropriation of grocery carts and similar shopping carts, a number of cart theft prevention systems have been suggested. A typical prior art anti-theft system comprises a lock out system which causes the carts to be immobilized when the carts pass a predetermined parameter relative to the retail establishment. These types of systems typically require that a usually quite complex and expensive brake lock or other immobilizing device be attached to, or built into the cart. Exemplary of such a prior art system is that described in U.S. Pat. No. 5,194,844 issued to Zelda. This patent discloses a theft prevention system for vehicles such as shopping carts, which are intended to be used within a prescribed area. The system includes a current conductor that circumscribes the prescribed area and each vehicle is equipped with a receiver circuit for operating a wheel lock mechanism when the vehicle moves out of the prescribed area. A somewhat similar prior art system is disclosed in U.S. Pat. No. 5,357,182 issued to Wolfe et. al.

Other more recent prior art security systems comprise the so called "Kart Control" system which is available from Controldyne Systems Inc. of Huntington Beach, Calif. and the Kart Saver System available from K-Lock and K-Alert Systems of Fairfield, Calif.

A common draw back of the prior art systems is the fact that the systems tend to be complex in construction and operation and most include large numbers of somewhat costly components which cause the systems to be expensive to manufacture. Further, the prior art systems tend to be generally unreliable in use and many are quite vulnerable to inclement weather conditions. Additionally, a number of the prior art systems are bulky, unattractive and can be hazardous in use. In this regard, certain of the prior art systems, which include an automatically actuated braking mechanism can cause the cart to come to an abrupt stop thereby subjecting the person pushing the cart to possible impact injury.

Another drawback of certain prior art wheel braking systems resides in the fact that, after the wheel is locked, the user of the cart will continue to push the cart even though one or more wheels may not rotate. This undesirably causes substantial damage to the locked wheel and frequently results in tread flattening which necessitates the costly replacement of the wheel.

As will become apparent from the description which follows, the novel wheel locking system of this present invention overcomes most of the drawbacks of the prior art systems and provides an elegantly simple and highly effective locking system which is easy to install and safe to use.

SUMMARY OF THE INVENTION

It is an object of the present invention to provide a simple, inexpensive and easy to install turn wheel locking device which disables the cart from normal use when the cart is removed from a prescribed area. More particularly, it is an object of the invention to provide a device of the aforementioned character which operates in conjunction with one of the forward turn or swivel wheels of the cart in a manner to cause the cart to travel only in a circle.

Another object of the invention is to provide a locking device of the character described in which the locking mechanism is triggered when the cart passes over a signal generator that circumscribes the shopping area or spans an exit thereto. In this case, the signal generators are connected to a low voltage power loop that circumscribes the shopping area.

Another object of the invention is to provide a turn wheel locking device, which when triggered, will not abruptly stop the cart in a manner to risk possibly serious injury to the user, but rather will merely disable the cart by locking one of the turn wheels in a turning configuration so that the cart can no longer travel in a straight line.

Another object of the invention is to provide a wheel locking device of the character described in the preceding paragraphs which can quickly and easily be installed on various types of push carts of conventional construction.

Another object of the invention is to provide a locking device as described in the preceding paragraph which is inexpensive to manufacture, is easy to install on a conventional cart, is highly reliable in use and can be quickly and easily reset to enable normal operation of the cart.

Another object of the invention is to provide a wheel lock system of the class described which disables the cart from normal operation in a manner such that a continued pushing force imposed on the cart by the user will not cause structural damage to the cart or to the locking system.

Another object of the invention is to provide a wheel turning lock for push carts such as grocery carts which can be used in inclement weather conditions without damage to the locking mechanism.

Other objects and advantages of the apparatus of the present invention will become apparent from the discussion which follows.

BRIEF DESCRIPTION OF THE DRAWINGS

FIG. 14 is a cross-sectional view taken along lines 14—14 of FIG. 13.

FIG. 15 is a cross-sectional view taken along lines 15—15 of FIG. 13

FIG. 16 is a cross-sectional view taken along lines 16—16 of FIG. 13.

FIG. 17 is a generally perspective, diagrammatic view of the turn wheel locking mechanism of this latest enbodiment of the invention.

FIG. 19 is a cross-sectional view taken along lines 19—19 of FIG. 18.

DESCRIPTION OF THE INVENTION

Figure 1:
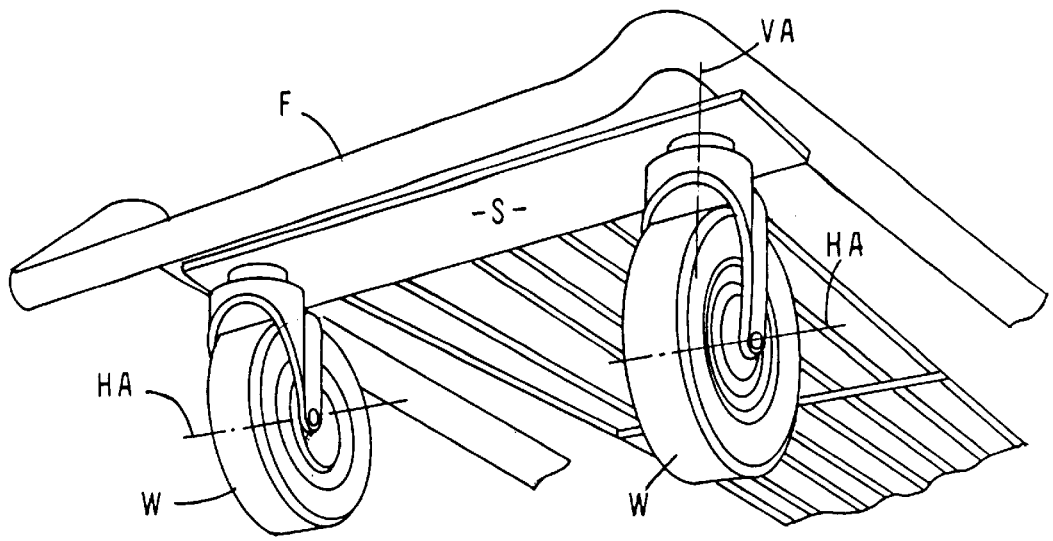
FIG. 1 is a generally perspective view of the front end portion of a conventional prior art push cart, such as a grocery cart.
Figure 2:
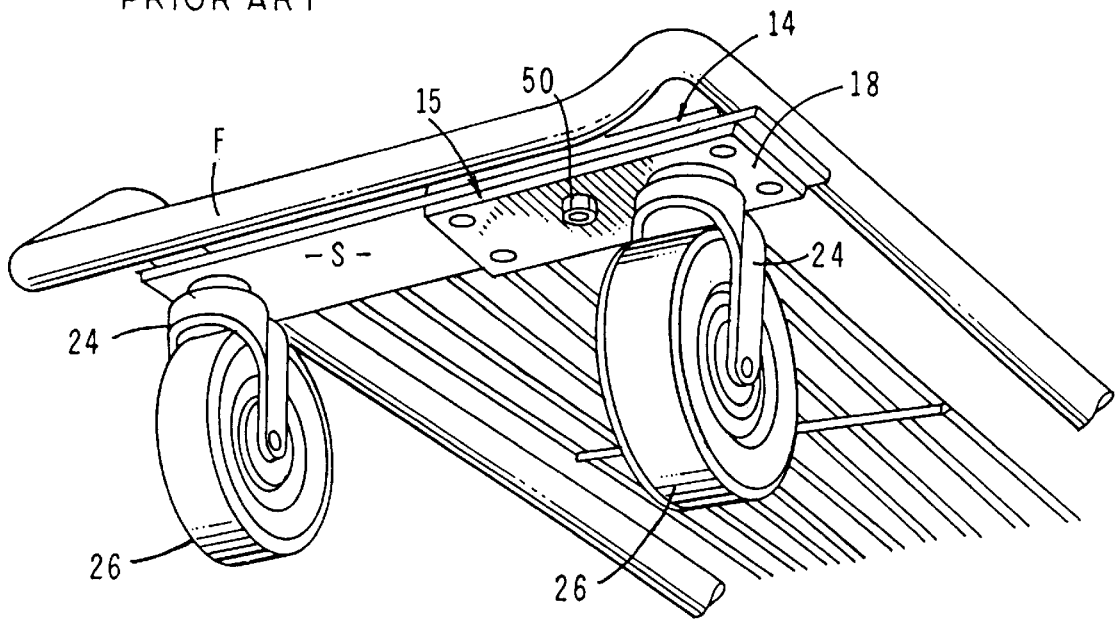
FIG. 2 is a generally perspective view similar to FIG. 1, but showing one form of the wheel locking apparatus of the invention connected to the transverse wheel supporting plate of the prior art push cart.

Referring to the drawings and particularly to FIG. 1, the lower front end portion of a typical prior art shopping cart is there illustrated. As shown in FIG. 1, the prior art shopping cart typically comprises a tubular frame "F" having a transversely extending support plate "S" which supports a pair of transversely spaced apart turn wheels "W". The turn wheels "W" rotate about a first horizontal axis, "HA" and also rotate about a generally vertical axis "VA". With this arrangement the shopping cart can be easily turned and maneuvered through the isles of the retail outlet and through the parking lot of the retail outlet and throughout the surrounding area.

Figure 3:
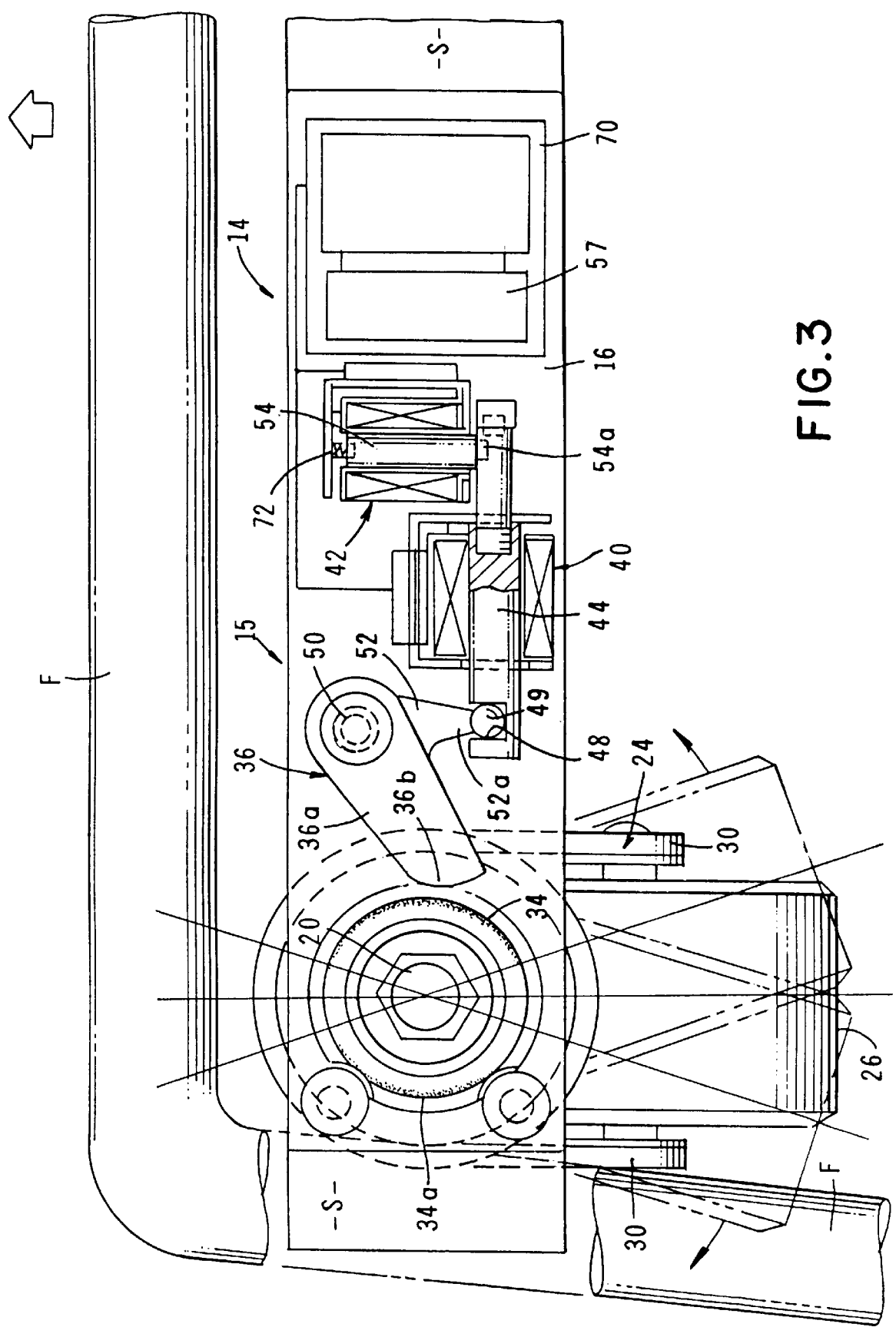
FIG. 3 is a top plan view of one form of the turn wheel locking apparatus of the present invention showing the apparatus in an unlocked configuration
Figure 4:
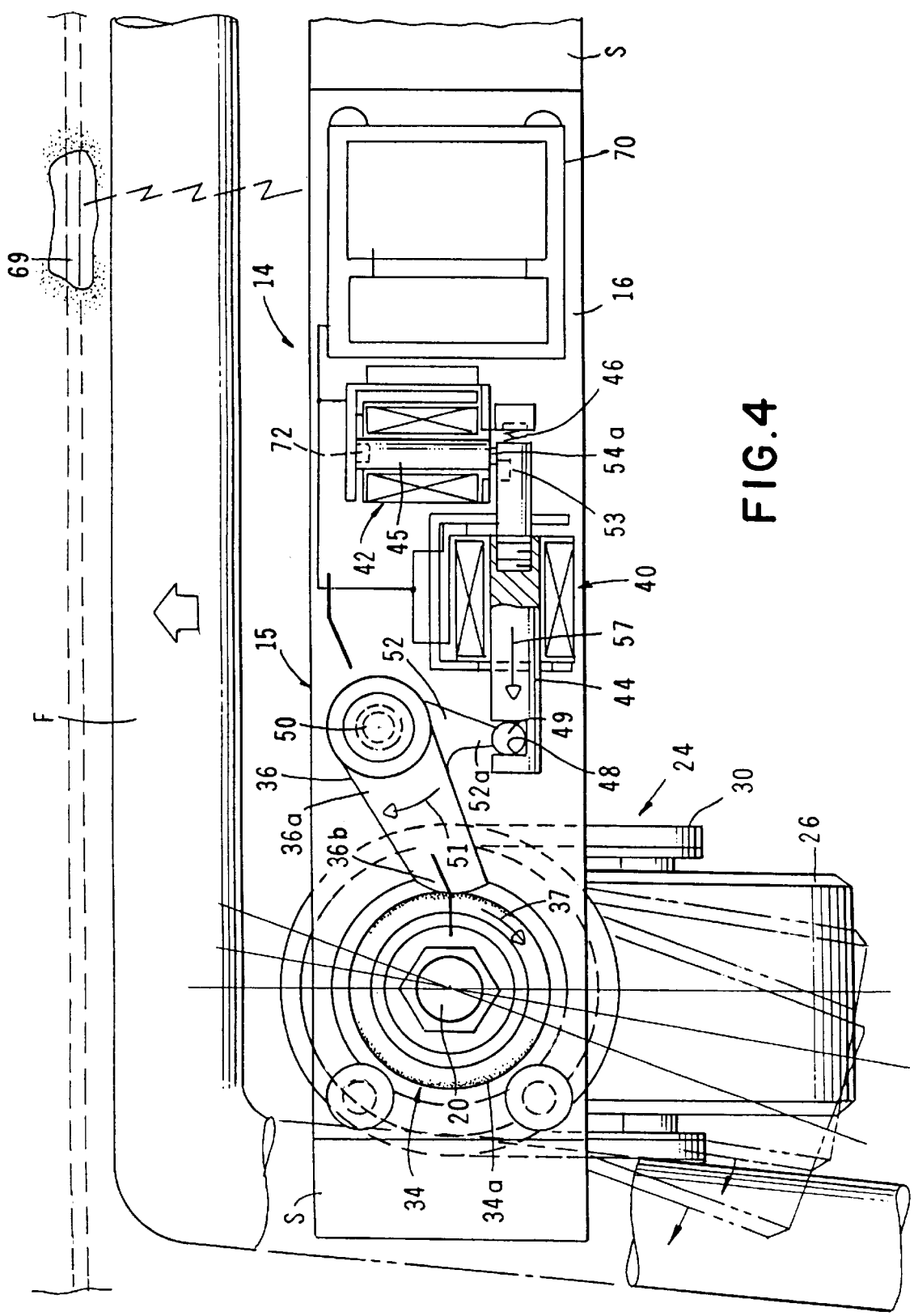
FIG. 4 is a top plan view similar to FIG. 3, but showing the apparatus in a wheel locking configuration.
Figure 5:
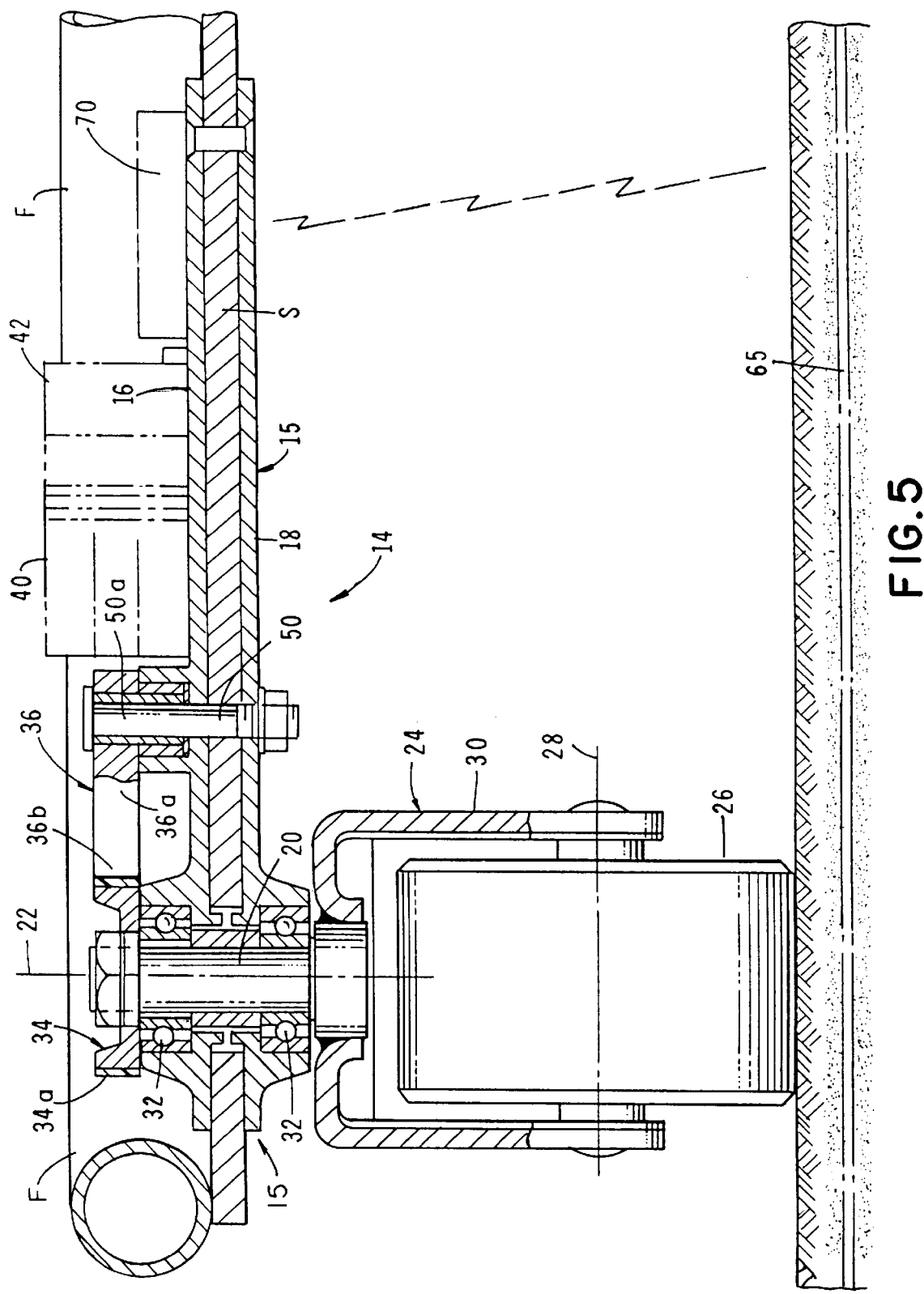
FIG. 5 is a front view of the apparatus shown in FIG. 4.
Figure 6:
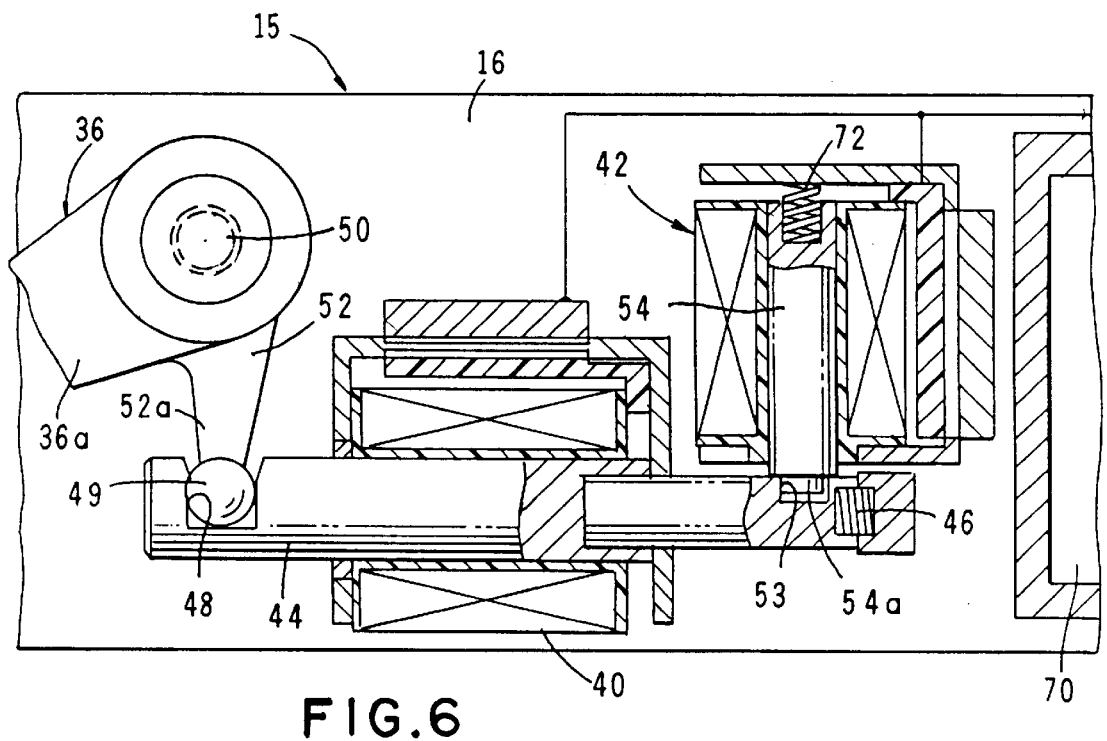
FIG. 6 is an enlarged, fragmentary top plan view similar to FIG. 3, showing the cam lock element of the apparatus in a retracted, unlocked position.

Turning next to FIGS. 2 through 7, one form of the turn wheel locking apparatus of the present invention is there illustrated and generally designated by the numeral 14. The locking apparatus is adapted for use with a selected wheel assembly of a vehicle such as a shopping cart of the character shown in FIG. 1. As best seen in FIGS. 3 and 5, the apparatus here comprises a support assembly 15 which includes a support platform 16 and a bottom plate 18, both of which are connected to the transverse support plate "S" of the shopping cart (FIG. 5). Rotatably connected to assemblage 15 is a generally, vertically extending shaft 20 which is adapted for rotation relative to assemblage 15 about a first axis 22. A wheel assembly 24 is connected to shaft 20 and comprises a wheel 26, which is substantially identical to wheels "W" of the conventional prior art cart shown in FIG. 1. The wheel 26 is rotatable about a second axis 28 which is generally perpendicular to the first axis 22 and is also rotatable with shaft 20 about axis 22. Wheel assembly 24 also includes a skirt like member 30 which extends over wheel 26 and is connected to the lower end of shaft 20.

As best seen in FIG. 5, shaft 20 is rotatably supported by a pair of vertically spaced bearing assemblies 32, which comprise a part of assemblage 15. Wheel locking means, the character presently to be described, are also carried by assemblage 15 and uniquely function to prevent rotation of wheel 26 about vertical axis 22 when the locking means are actuated.

In the present form of the invention, the novel locking means of the invention comprise a disk-like engaged member 34 which is connected to shaft 20 for rotation therewith. The locking means also include a novel cam like engagement member 36 which is movable into engagement with engaged member 34. For this purpose member 35 includes body portion 36a which terminates in a curved end portion 36b. When the engagement member is in its locking position shown in FIG. 4, curved end portion 36b engages engaged member 34 in a manner to prevent its rotation in a first direction. More particularly, the cam like engagement member 36 is uniquely configured so that when it is in its locking position as shown in FIG. 4, it will permit rotation of engaged member 34 along with shaft 20 in a first direction, but will effectively block its rotation in the opposite direction. With this novel arrangement, when engagement member 36 is moved into locking engagement with the engaged member, or disk 34 in the manner shown in FIG. 4, as the cart is being pushed, the turn wheel will be permitted to rotate in the first direction, indicated by the arrow 37, but will be locked against rotation in a second opposite direction. This of course means that once the locking means of the apparatus is actuated by the novel actuating means of the invention, the character of which will presently be described, the turn wheel 26 will rotate to a first cart turning configuration, but will be securely locked against rotation in an opposite direction. Accordingly, once the locking means is actuated, the shopping cart will be limited to movement only along a generally circular path and will be positively prevented from traveling along a straight line path until the locking means is reset.

In the form of the invention shown in FIGS. 1 through 7 of the drawings, the important actuator means of the invention for actuating the locking means comprises a pair of cooperating conventional battery operated solenoids 40 and 42 which are mounted on platform 16. In a manner presently to be described, solenoids 40 and 42 are operably interconnected with electrical circuit means which are carried by assemblage 15 and which also form a part of the actuator means. Solenoid 40 includes a reciprocating core 44 which is moved by a biasing means, shown here as a spring 46, from the first position shown in FIG. 6 into the second extended position shown FIG. 7. Solenoid core 44 is provided with a cavity 48 which receives a sphere like extremity 50 formed proximate end 52a of an actuating arm 52. As best seen in FIG. 4, actuating arm 52 is integrally formed with the body portion 36a of engagement member 36 and extends angularly therefrom. With the construction shown, when core 44 of solenoid assembly 40 is moved forwardly, or to the left as viewed in FIG. 3, the engagement member 30 will be rotated in the direction of arrows 51 (FIG. 4) from the retracted position shown in FIG. 3 to the locking position shown in FIG. 4 where curved end portion 36b of the engagement member will move into engagement with the peripheral surface of disk like, engaged member 34 (see also FIGS. 6 and 7). As best seen by referring to FIG. 5, shaft 50 is rotatably carried by platform assemblage 15 and includes an upper shaft portion 50a to which engagement member 36 is rotatably connected.

Turning once again to FIG. 6, it is to be noted that core 44 of solenoid 40 also includes a cavity 53 which closely receives end 54a of a core 54 of solenoid assembly 42 which here functions as a restraining means for restraining core 44 of solenoid assembly 40 in its retracted position. With this arrangement, prior to solenoid assembly 42 being energized, core 54 of solenoid assembly 42 will securely maintain core 44 of solenoid assembly 42, in the retracted position shown in FIG. 6. However, upon energization of solenoid assembly 42, core 54 will be retracted by the electro magnets of the assembly to a position where end 54a is retracted from cavity 53 thereby permitting spring 46 to urge core 44 of solenoid assembly 40 to the left in the direction of the arrow 57 of FIG. 7.

As previously discussed, with engagement member 36 disposed the position shown in FIG. 4, as the cart is pushed along, engaged member 34 will be permitted to freely rotate in the direction of arrow 37 of FIG. 4. However, if the customer attempts to turn the cart in the opposite direction, engagement member 36 will engageably lock the peripheral surface of engaged member 34 in a manner to positively prevent rotation of member 34 and shaft 20 in the opposite direction. To assist in resisting rotation of member 34, the member is preferably provided with a coating of a yieldably deformable elastomeric material 34a such as rubber. With shaft 20 thusly locked against rotation, the cart will, of course, be limited to movement along a generally circular path. Accordingly, any further attempt by the customer to remove the cart from the premises will be fruitless.

During system operation, solenoid 42, is operated in a conventional manner by the electrical circuit means of the invention, which is also of a conventional construction well known to those skilled in the art. The electrical circuit means, which comprises a part of the actuator means of the invention, includes a battery 57 and a novel signal generating means. The signal generating means here comprises a low voltage power loop 60 which extends about the parameter of a prescribed area and a plurality of spaced-apart antenna loops 65 and 69. By way of example, a low voltage power supply 62 can be positioned inside a building 64 and can be operably connected to the power loop 60 which circumscribes the area 67 which is controlled by the retail outlet housed within the building 64. Interconnected with low power loop 60 are the plurality of strategically located antenna loops. By way of example, antenna loops 65 (FIG. 11) span driveways leading into area 67 while an antenna loop 69 spans a pedestrian walkway. Local area transmitter 60a, which forms a part of the signal means, is interconnected with both the low voltage power loop 60 and with antenna loops 65 and 69. The local area transmitters, which are of a conventional construction well known to those skilled in the art, are preferably placed in partially buried, but easily accessible containers in the manner shown in FIG. 11. The low power loop 60 is also preferably buried beneath the surface as to be protected from impact and damage from the elements. If desired, the transmitters 60a can include indicator lights showing power and transmitter status. With the novel construction thus described, trouble shooting of the signal transmitting means can be accomplished on a zone-by-zone basis and inadvertent energization of the locking means of carts parked proximate the boundary of the shopping area is avoided.

Figure 7:
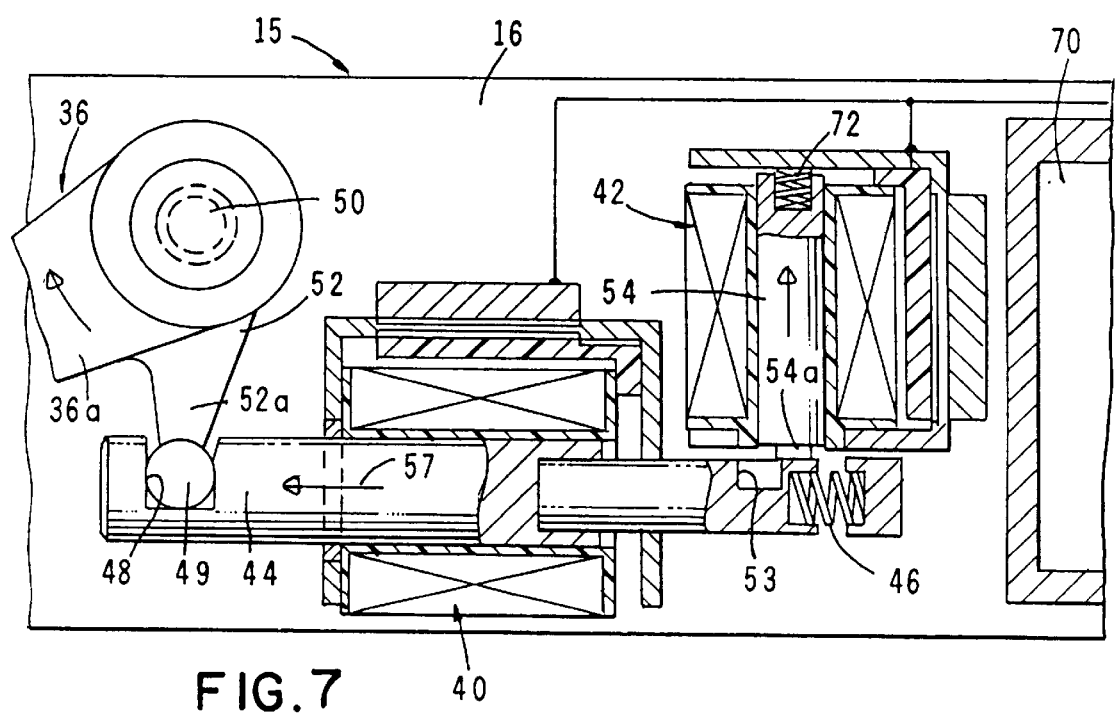
FIG. 7 is an enlarged, fragmentary top plan view similar to FIG. 6, but showing the cam lock element in a wheel locking configuration.

Referring to FIG. 3, it is to be noted that the electrical circuit means of apparatus of the invention further includes a circuit board 70, which is mounted on support platform 16. Circuit board 70, which is of a conventional, construction is interconnected with and powered by battery 57 which also powers the battery operated solenoid assemblies 40 and 42. Circuit board 70 includes conventional electronic components such as transistors, capacitors and so forth for receiving, amplifying and detecting the frequency signal generated by the signal generating means or antenna loops 65 and 69. When a given frequency signal is detected, solenoid 42 is instantaneously activated in a manner to move core 54 into the retracted position against the urging of a second biasing means shown here as a coil spring 72. (see also FIGS. 6 and 7) Coil spring 71 functions to normally urge core 54 into the extended locked position shown in FIG. 6 wherein it prevents movement of core 44 in the direction of arrow 57 (FIG. 7). However, once core 44 has moved into the locked position, end 54a of core 54 will engage core 44 so as to prevent movement of core 54 into its starting position.

It is to be understood that the specific electronic components used in the circuitry of the present invention can be very sensitive drawing very little power. Accordingly, the electrical circuit means of the invention has very low power requirements. Accordingly, under normal usage battery 54 will last about four years which is the manufacturers suggested shelf life.

Circuit board 70 can also include a motion detector to conserve battery power and can be provided in the form of a thin ceramic piezo film of a character well known to those skilled in the art. Thus when the shopping cart is at rest, a sensitive passive switch could be used to turn the electronic operating means off. Other types of systems well understood by those skilled in the art can also be used to conserve battery life. Circuit board 70 can also include a tuned circuit to reject other frequencies so that numerous alternate frequencies can be used. Thus, advantageously, a cart manufactured with one of those frequencies would not be usable in transmitting systems that use any of the other frequencies thereby further discouraging theft of the carts.

Figures 11, 12:
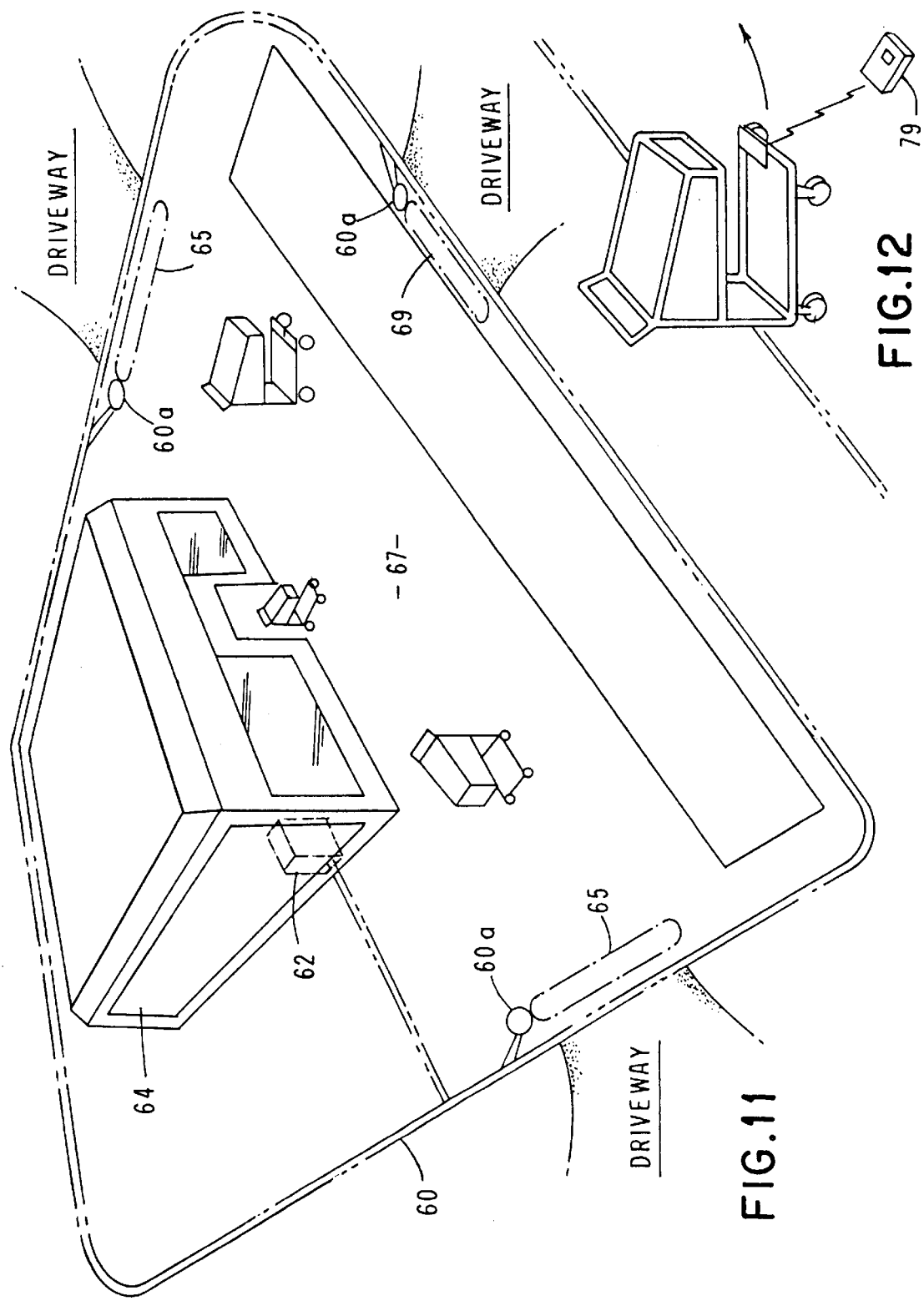
FIG. 11 is a generally diagrammatic view illustrating one form of signal generator of the invention which circumscribes the retail area and activates the turn wheel locking mechanism when the cart is removed from the prescribed area.
FIG. 12 is a generally diagrammatic view of one form of reset system for resetting the wheel locking mechanism.

After a given cart has traveled over or near one of the antenna loops 65 or 69, which causes the locking means to be moved into the locked configuration shown in FIG. 4, the cart can only travel along a generally circular path. To reset the locking means so as to enable the cart to be used in a normal manner, several types of reset means could be applied. One form of such reset means is schematically illustrated in FIG. 12 of the drawings. This means involves the use of a hand-held transmitter 79 of conventional design which can be used to transmit a signal to the circuitry of circuit board 70 which would cause energization of solenoid assembly in a manner to urge core 44 thereof to retain to its original starting position as shown in FIG. 3. As core 44 is moved into the starting position, end 54*a* of core 54 of solenoid assembly 42 will align with cavity 53 and will be urged by spring 72 to move into cavity 53. Additionally, as core 44 is moved into its retracted position, as shown in FIG. 3, engagement member 36 will be pivoted into the unlocked position shown in FIG. 3 and will be retained in this position so long as core 44 of solenoid 40 is locked in the retracted position by core 54 (FIG. 3). The construction and operation of hand held transmitter 79 is well known to those skilled in the art as is the construction and design of circuit board 72, the circuitry of which functions to selectively activate solenoids 40 and 42.

As previously mentioned a variety techniques could be used to reset the solenoids of the apparatus. For example, various types of user operated mechanical key locking systems could be devised to move the cores of the solenoid into a desired position.

Figure 8:
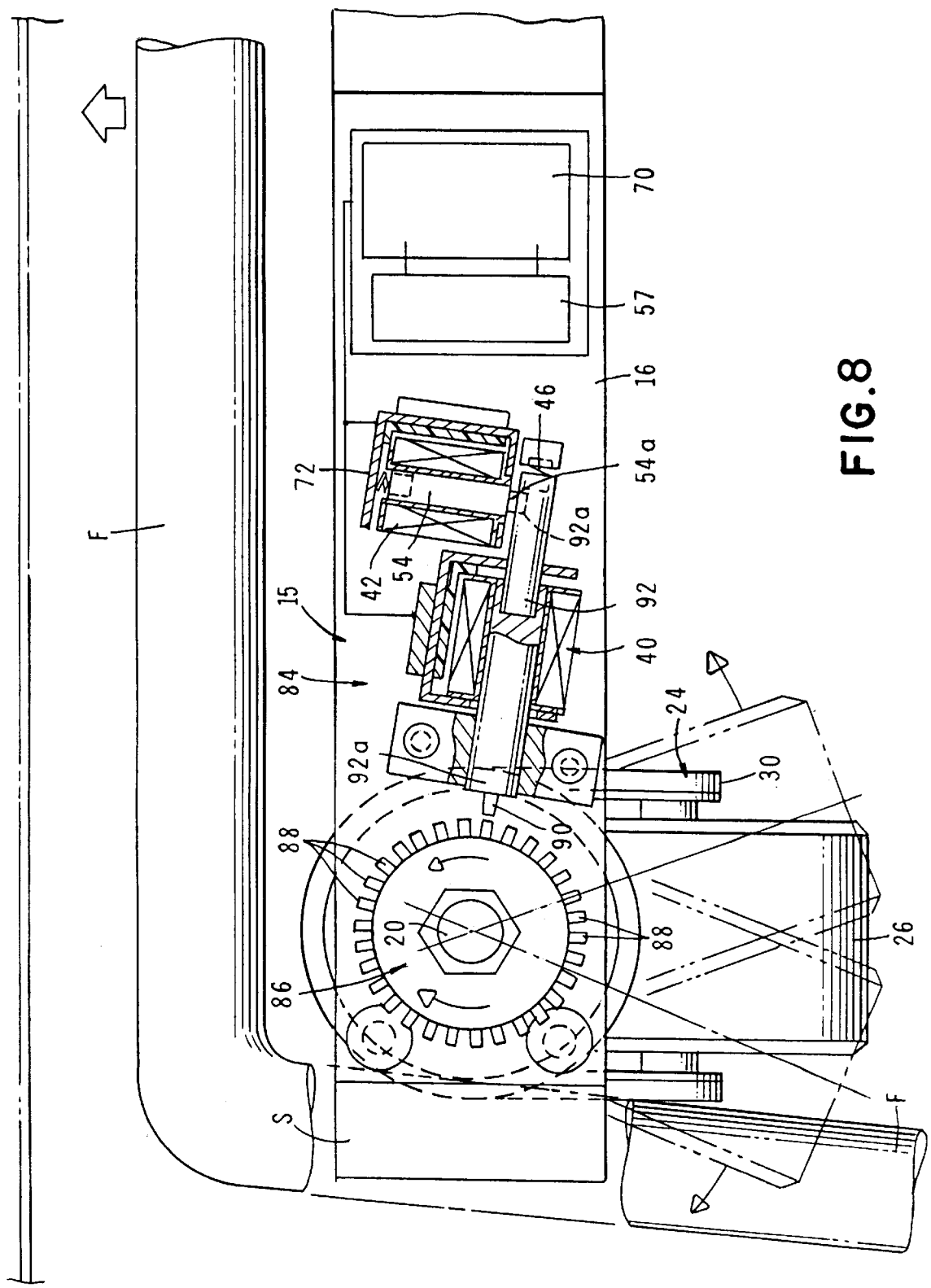
FIG. 8 is a top plan view of an alternate form of the turn wheel locking apparatus of the invention.
Figure 9:
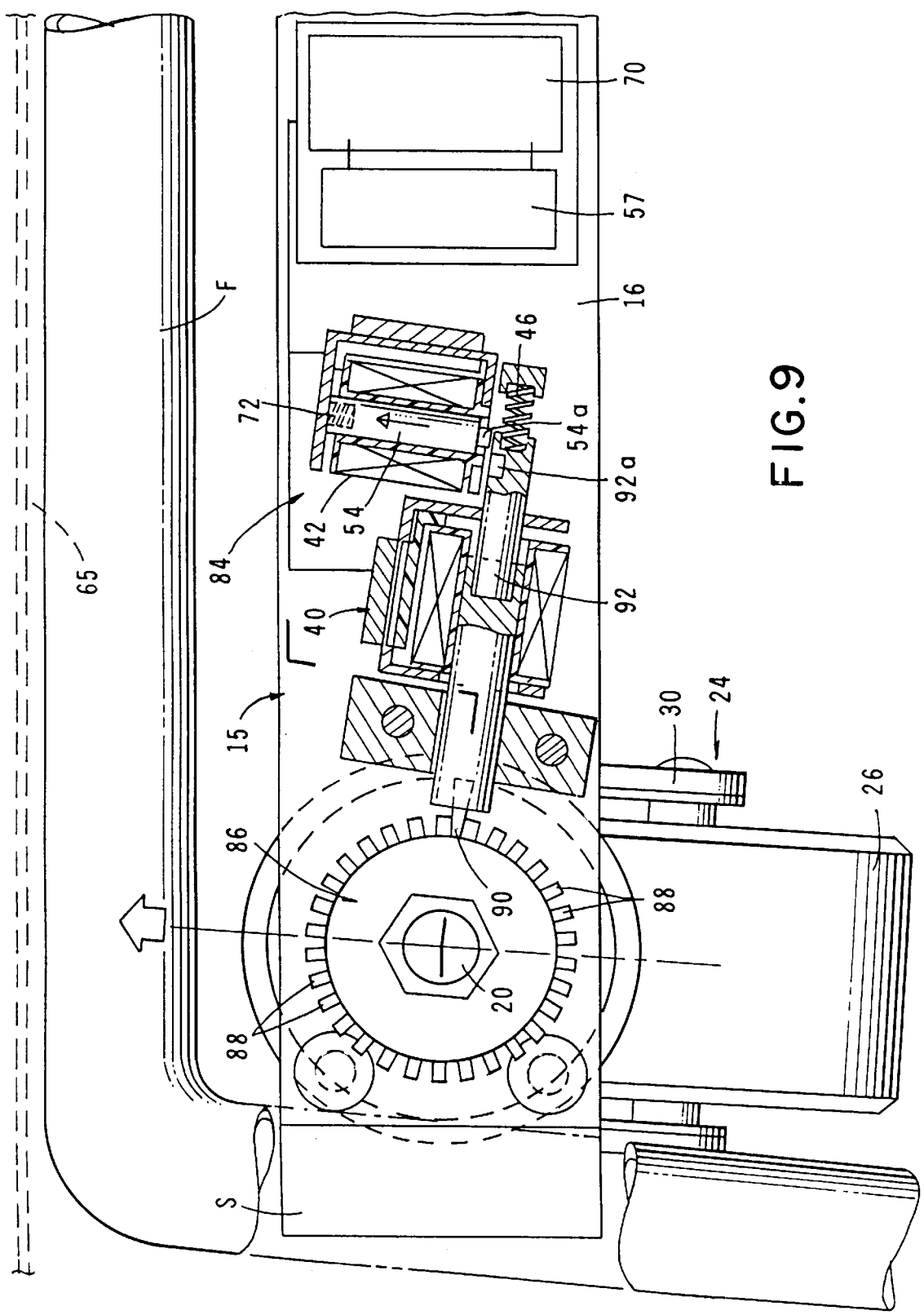
FIG. 9 is a top plan view similar to FIG. 8 but showing the apparatus in a locked configuration.
Figure 10:
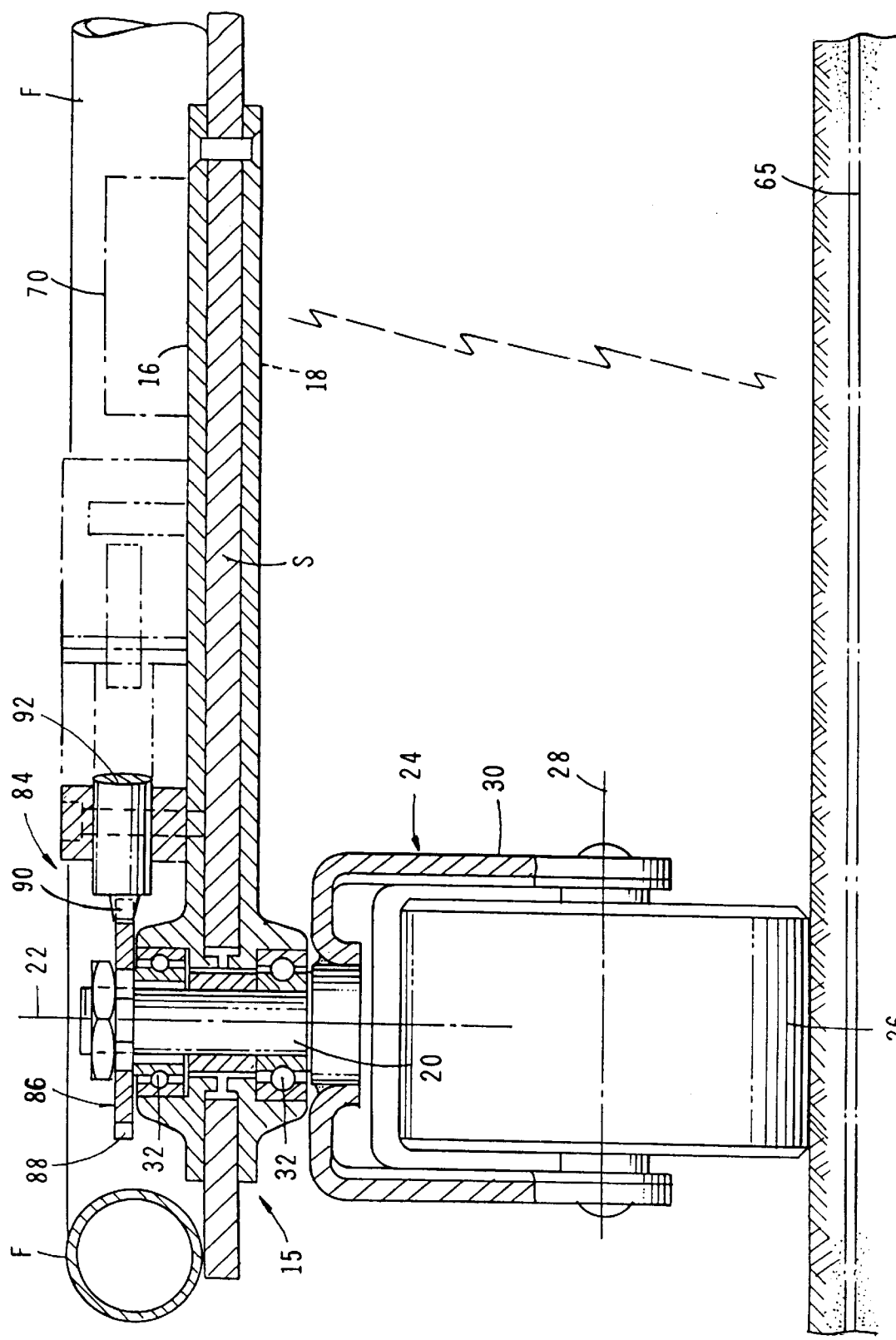
FIG. 10 is a front view of the apparatus shown in FIG. 9.

Turning next to FIGS. 8, 9, and 10, an alternate form of the wheel locking device of the apparatus is there illustrated and generally designated by the numeral 84. This apparatus is similar in some aspects to the locking apparatus illustrated in FIGS. 1 through 7, and like numbers are used to identify like components. Like the earlier described apparatus, the alternate form of the invention comprises a support platform assembly 15 which is connected to the transverse plate "s" of the shopping cart. Rotatably connected to assemblage 15 is a generally vertically extending shaft 20 which is adapted for rotation relative to assemblage 15 about a first axis 22. The wheel assembly 24 which is connected to shaft 20 is of identical construction to that previously described, and the wheel 26 of the assemblage is rotatable about a second axis which is generally perpendicular to first axis 22. As before, shaft 20 is rotatably supported by a pair of vertically spaced bearing assemblies 32 which are of similar constriction to the bearing assemblies previously described.

In this latest form of this invention the locking means comprises a disk like engaged member 86 which is of slightly different construction than that of engaged member 34. More particularly, engaged member 86, which is connected to shaft 20 for rotation therewith, includes a plurality of circumferentially spaced protuberances 88 (FIG. 8). Protuberances 88 are spaced apart a sufficient distance to lockably receive an engagement member 90 which is formed proximate the outboard extremity 92*a* of a solenoid core 92 (FIG. 8). When the engagement member 90 is in the retracted position shown in FIG. 8, engaged member 86 is free to rotate in either direction. However, when engagement member 90 is moved by the actuator means into the locked configuration shown in FIG. 9, engaged member 86 is locked against rotation in either direction.

The spacing between locking protuberances 88 is such that, after the cart crosses a signal generating antenna 65, the wheels can turn slightly before locking member 90 is moved into locking engagement between two adjacent protuberances. Once the engagement member 90 is in locked engagement with engaged member 86, the turn wheel of the cart will, of course, be locked in the wheel-turned configuration, thereby rendering the cart very difficult to maneuver in any direction other than the locked direction.

The actuating means of this second form of the invention is quite similar to the earlier described actuating means and comprises a pair of cooperating, conventional battery operated solenoids 40 and 42 which are of the same construction and operation as the solenoids earlier described. As before, solenoid 40 includes a reciprocating core 92 which is moved by a biasing means, shown here as a spring 46, from the first position shown in FIG. 8 to the second extended position shown in FIG. 9. Like solenoid core 44, core 92 is provided with a cavity 92*a* which closely receives end 54*a* of a core 54 of solenoid assembly 42. Until solenoid assembly 42 is energized, core 54 will maintain core 92 in the retracted position shown in FIG. 8. However, upon energization of solenoid assembly 42 by the actuating means, core 54 will be retracted into a position where end 54*a* is retracted from cavity 53 so as to permit spring 46 to urge core 92 to the left and into the locking position shown in FIG. 9.

Solenoids 40 and 42 are once again operated by a conventional battery 57 which also powers the electrical circuitry of the electrical circuit means of the invention, which means also includes the previously identified circuit board 70. As before, circuit board 70 functions to receive signals from the signal generating antennas 65 and 69 and also permits resetting of the locking mechanism of the invention in the manner previously described through use of the hand-held transmitter 79.

Figure 13:
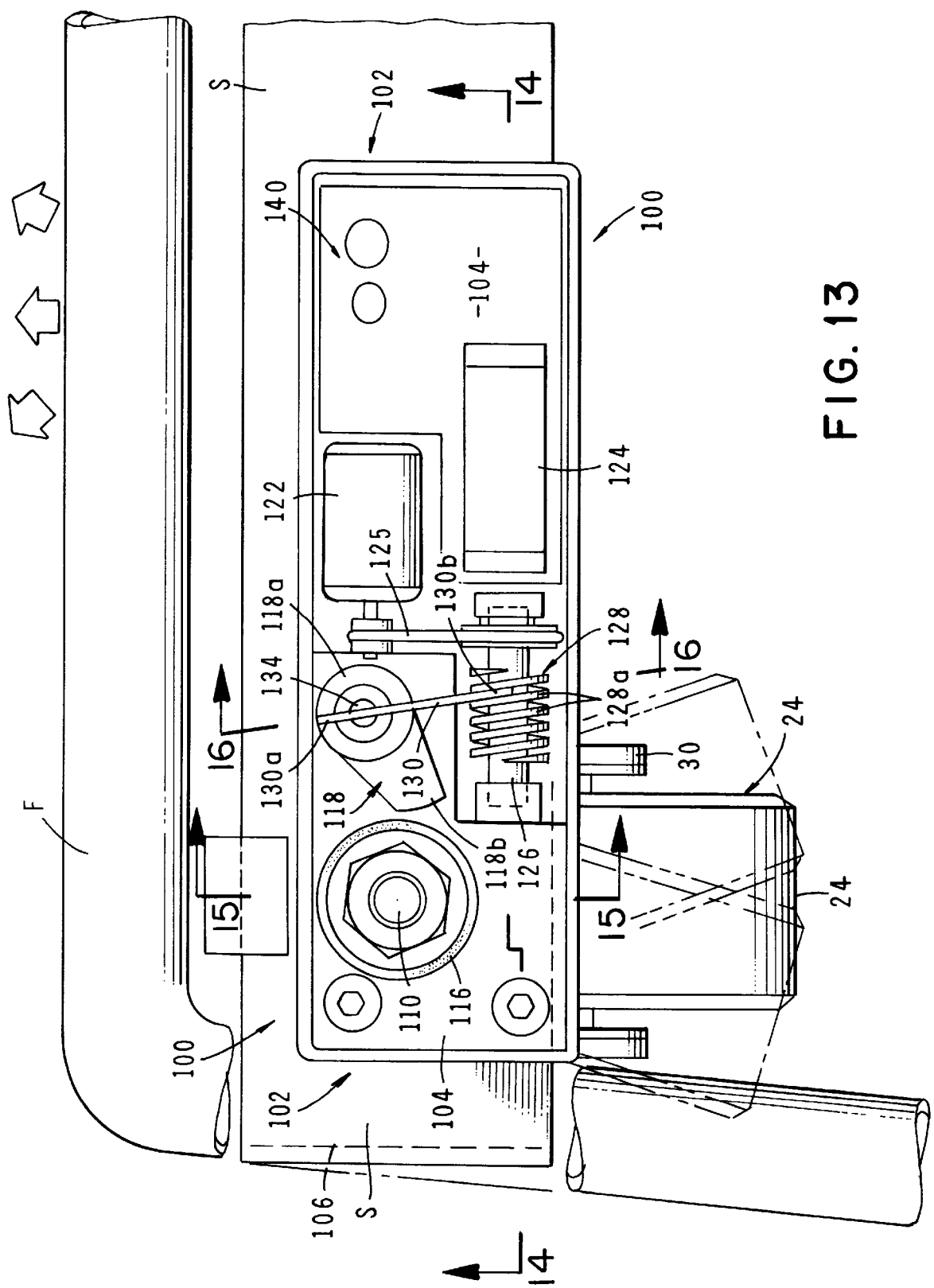
FIG. 13 is a top plan view of still another alternate form of the turn wheel locking apparatus of the invention.

Turning next to FIGS. 13 through 19, yet another form of the turn wheel locking apparatus of the present invention is there illustrated and generally designated by the numeral 100. As before, the locking apparatus of this latest form of the invention is adapted for use with a selected wheel assembly of a vehicle such as a shopping cart of the character shown in FIG. 1. The apparatus is somewhat similar to that previously described herein and like numbers are used in FIGS. 13 through 19 to identify like components. As best seen in FIGS. 13 and 14, the apparatus here comprises a support assembly 102 which includes a support platform 104 and a bottom plate 106, both of which are connected to the transverse support plate "S" of the shopping cart (FIG. 14). Rotatably connected to assemblage 102 is a generally, vertically extending shaft 110 which is adapted for rotation relative to assemblage 102 about a first, generally vertical axis 112 (FIG. 15). A wheel assembly 24 is connected to shaft 110 and comprises a wheel 26, which is substantially identical to wheels "W" of the conventional prior art cart shown in FIG. 1. As before, wheel 26 is rotatable about a second axis, which is generally perpendicular to the first axis 112, and is also rotatable with shaft 110 about axis 112. Wheel assembly 24 also includes a skirt like member 30 which extends over wheel 26 and is connected to the lower end of shaft 110 in the manner shown in FIG. 15.

As best seen in FIG. 15, shaft 110 is rotatably supported by a pair of vertically spaced bearing assemblies 114 which comprise a part of assemblage 102. The wheel locking means of this latest form of the invention, are also carried by assemblage 102 and uniquely function to prevent rotation of wheel 26 about vertical axis 112 when the locking means are actuated in a manner presently to be described.

Figure 18:
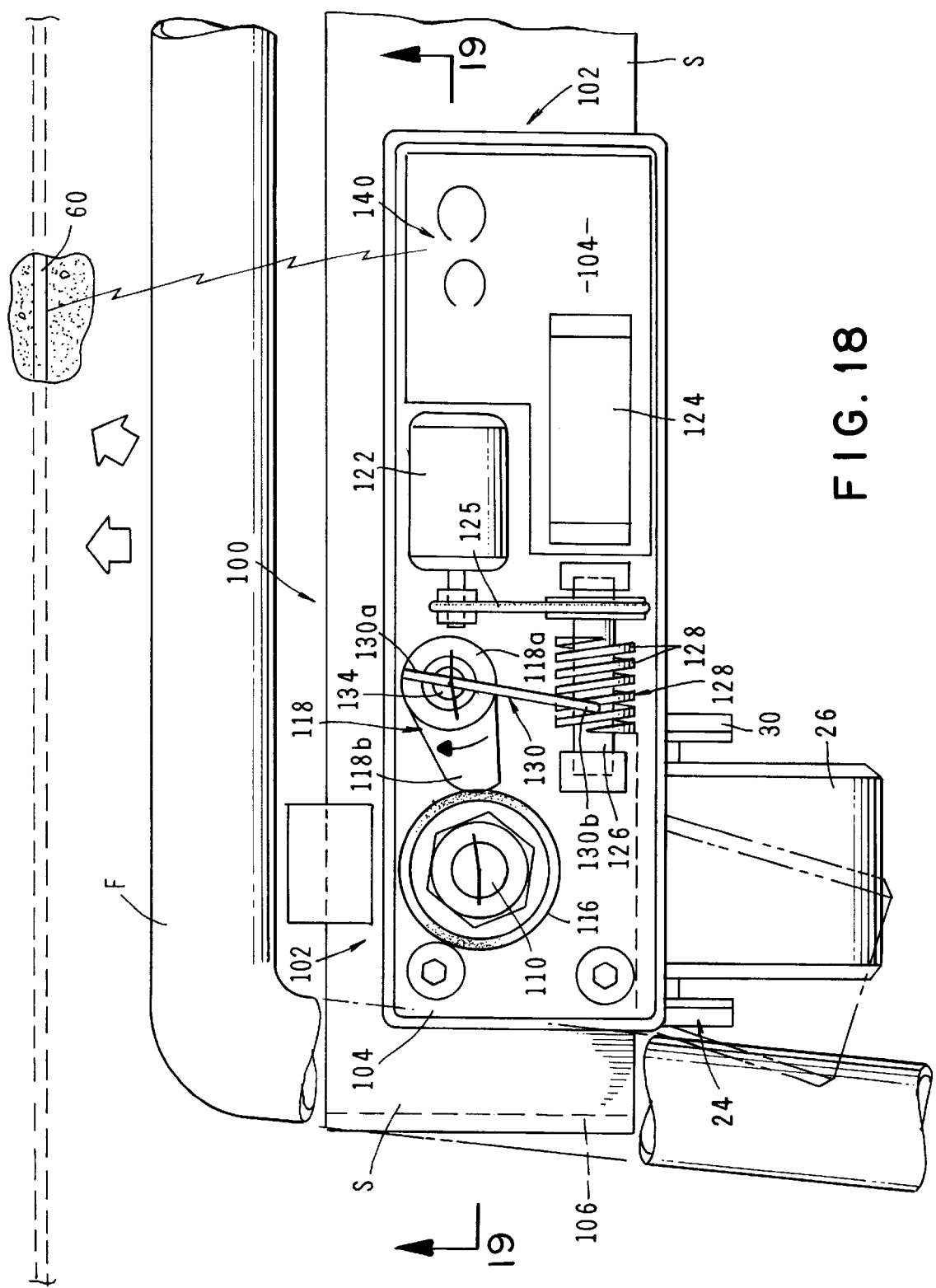
FIG. 18 is a top plan view similar to FIG. 13, but showing the apparatus in a wheel-locking configuration.

In this latest form of the invention, the locking means comprise a disk-like engaged member 116 which is connected to shaft 110 for rotation therewith (FIG. 17). The locking means also include a novel cam like engagement member 118 which is movable into and out of engagement with engaged member 116. Member 118 is quite similar to previously identified engagement member 35 and includes body portion 118a which terminates in a curved end portion 118b. When the engagement member is in its locking position shown in FIG. 18, curved end portion 118b engages engaged member 116 in a manner to prevent its rotation in a first direction. More particularly, the cam like engagement member 118 is uniquely configured so that when it is in its locking position as shown in FIG. 18, it will permit rotation of engaged member 116 along with shaft 110 in a first direction, but will effectively block its rotation in the opposite direction. With this novel arrangement, when engagement member 118 is moved into locking engagement with the engaged member, or disk 116 in the manner shown in FIG. 18, as the cart is being pushed, the turn wheel will be permitted to rotate in a first direction, but will be locked against rotation in a second opposite direction. This of course means that once the locking means of the apparatus is actuated by the novel actuating means of the invention, the character of which will presently be described, the turn wheel 26 will rotate to a first cart turning configuration, but will be securely locked against rotation in an opposite direction. Accordingly, as before, once the locking means is actuated, the shopping cart will be limited to movement only along a generally circular path and will be positively prevented from traveling along a straight line path until the locking means is reset.

In this latest form of the invention as shown in FIGS. 13 through 19 the important actuator means of the invention for actuating the locking means is somewhat different in construction and operation from that previously described and here comprises a novel drive means that is appropriately mounted on platform 104. The drive means here comprises an electric motor 122 which is driven by a source of electricity here provided as a dry cell battery 124. Connected to motor 122 and rotatably driven thereby by a conventional drive belt 125 is an elongated shaft 126. Circumscribing and connected to shaft 126 and rotatable therewith is a helix here provided as a helix thread 128, which includes a plurality of spirals 128a.

The actuator means further comprises a novel drive arm 130 having first and second end portions 130a and 130b respectively. First end portion 130a is connected to the upper surface of cam-like member 118 in the manner shown in FIGS. 16 and 17 while second end 130b is movable in the manner shown by the phantom lines of FIG. 17 between first and second locations. As indicated in FIG. 17, as end potion 130b moves along helix 128, it will cause the engagement member 118 to rotate about a generally vertical stub axle 134 (FIG. 16) and into and out of engagement with the engaged member or disk 116. More particularly, as shown in FIG. 16, end portion 130b includes a downwardly extending finger portion 131 that extends between adjacent coils or spirals 128a of helix 128. With this construction, as shaft 126 along with helix 128 are rotated by motor 122, finger 131 will be caused to advance or retract as indicated by the phantom lines of FIG. 17. As the finger is advanced, member 118 will be rotated from the retracted position shown in FIG. 13 to the wheel-locking position shown in FIG. 18 where curved end portion 118b of the engagement member will move into engagement with the peripheral surface of disk-like, engaged member 116.

During system operation, electric motor 122 is operated in a conventional manner by the electrical circuit means of the invention, which is also of a conventional construction well known to those skilled in the art. The electrical circuit means, which comprises a part of the actuator means of the invention, includes the previously mentioned battery 124 and a signal generating means of the character previously described in connection with the earlier described embodiments. As before, the signal generating means comprises a low voltage power loop 60 which extends about the parameter of a prescribed area and a plurality of spaced-apart antenna loops 65 and 69 (FIG. 11). Local area transmitter 60a, which forms a part of the signal means, is interconnected with both the low voltage power loop 60 and with antenna loops 65 and 69. The local area transmitters, which are of a conventional construction well known to those skilled in the art, are preferably placed in partially buried, but easily accessible containers in the manner shown in FIG. 11. The low power loop 60 is also preferably buried beneath the surface as to be protected from impact and damage from the elements.

Referring to FIG. 18, it is to be noted that the electrical circuit means of apparatus of the invention further includes a circuit board 140, which is mounted on support platform 104. Circuit board 140, which is of a conventional, construction is interconnected with and powered by battery 124 which also powers the electric motor 122. As in the earlier described embodiments, circuit board 140 includes conventional electronic components for receiving, amplifying and detecting the frequency signal generated by the signal generating means or antenna loops 65 and 69. When a given frequency signal is detected, motor 122 is instantaneously energized in a manner to rotate shaft 126 and helix 128. As the helix rotates, drive arm 130 will controllably rotate engagement member 118 about stub shaft 134 causing the engagement member to move into engagement with the periphery of member 116 (FIG. 18) so as to lock the turn wheel in a turn configuration.

After a given cart has traveled over or near one of the antenna loops 65 or 69, which causes the locking means to be moved into the locked configuration shown in FIG. 18, the cart can only travel along a generally circular path. To reset the locking means so as to enable the cart to be used in a normal manner, several types of reset means of the character previously discussed herein can be applied to energize motor 122 in a manner to cause drive arm 130 to return member 116 into its starting, unlocked position.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

What is claimed is:

1. A turn wheel locking apparatus for use with a wheel assembly of a vehicle usable within an area, said vehicle having a wheel rotatable about a first generally horizontal axis and also rotatable about a second generally vertical axis, said turn wheel locking apparatus functioning to lock in the wheel against rotation about the second axis, said apparatus comprising:

(a) an engaged member rotatable with the wheel assembly about the second axis, said engaged member having a surface;

(b) engagement means engagable with said surface of said engaged member for engagement therewith to block rotation of said engaged member; and (c) actuator means associated with said engagement means for moving said engagement means into engagement with said surface of said engaged member, said actuator means comprising:
  (i) a drive arm having a first end connected to said engagement member and a second end, said second end being movable between first and second locations to move said engagement member into and out of engagement with said engaged member; and
  (ii) drive means operably associated with said drive arm for moving said drive arm between said first and second locations said drive means comprising a shaft operably coupled with said second end of said drive arm and means for rotating said shaft.

2. An apparatus as defined in claim 1 in which said engagement means, when in engagement with said surface of said engaged member, will block rotation thereof.

3. An apparatus as defined in claim 1 in which said wheel assembly comprises a generally vertical shaft interconnected with said wheel, said engaged member being connected to said shaft for rotation therewith.

4. A turn wheel locking apparatus for use with a wheel assembly of a vehicle usable within an area, said vehicle having a wheel rotatable about a first generally horizontal axis and also rotatable about a second generally vertical axis, said turn wheel locking apparatus functioning to lock in the wheel against rotation about the second axis, said apparatus comprising:
  (a) an engaged member rotatable with the wheel assembly about the second axis, said engaged member having a surface;
  (b) engagement means engagable with said surface of said engaged member for engagement therewith to block rotation of said engaged member; and
  (c) actuator means associated with said engagement means for moving said engagement means into engagement with said surface of said engaged member, said actuator means comprising:
    (i) a drive arm having a first end connected to said engagement means and a second end, said second end being movable between first and second locations to move said engagement means into and out of engagement with said engaged member; and
    (ii) drive means operably associated with said drive arm for moving said drive arm between said first and second locations, said drive means comprising:
      a. a helix operably coupled with said second end of said drive arm; and
      b. motor means for rotating said helix.

5. An apparatus as defined in claim 4 in which said drive means further includes an elongated shaft rotatably driven by said motor means, said helix being connected to said shaft for rotation therewith.

6. An apparatus as defined in claim 4 in which said engaged member comprises a disk-like member having a peripheral surface.

7. An apparatus as defined in claim 6 in which said engagement means comprises a cam member engagable with said peripheral surface of said disk like member.

8. A turn wheel locking apparatus for use with a wheel assembly of a vehicle usable within an area, said vehicle having a wheel rotatable about a first generally horizontal axis and also rotatable about a second generally vertical axis, said turn wheel locking apparatus functioning to lock in the wheel against rotation about the second axis, said apparatus comprising:
  (a) an engaged member rotatable with the wheel assembly about the second axis, said engaged member having a surface;
  (b) engagement means engagable with said surface of said engaged member for engagement therewith to block rotation of said engaged member; and
  (c) actuator means associated with said engagement means for moving said engagement means into engagement with said surface of said engaged member, said actuator means comprising:
    (i) a drive arm having a first end connected to said engagement member and a second end, said second end being movable between first and second locations to move said engagement member into and out of engagement with said engaged member; and
    (ii) drive means operably associated with said drive arm for moving said drive arm between said first and second locations, said drive means comprising:
      a. a helix operably coupled with said second end of said driving arm; and
      b. motor means for rotating said helix.

9. An apparatus as defined in claim 8 in which said drive means further includes an elongated shaft rotatably driven by said motor means, said helix being connected to said shaft for rotation therewith.

10. An apparatus as defined in claim 9 in which said engaged member comprises a disk-like member having a peripheral surface.

11. An apparatus as defined in claim 10 in which said engagement means comprises a cam member engageable with said peripheral surface of said disk-like member.

12. A turn wheel locking apparatus for use with a wheel assembly of a vehicle usable within an area, said vehicle having a wheel rotatable about a first generally horizontal axis and also rotatable about a second generally vertical axis, said turn wheel locking apparatus functioning to lock in the wheel against rotation about the second axis, said apparatus comprising:
  (a) an engaged member rotatable with the wheel assembly about the second axis, said engaged member having a surface, said engaged member comprising a disk-like member having a peripheral surface;
  (b) engagement means comprising a cam member engagable with said peripheral surface of said engaged member for engagement therewith to block rotation of said engaged member; and
  (c) actuator means associated with said engagement means for moving said engagement means into engagement with said surface of said engaged member, said actuator means comprising:
    (i) a drive arm having a first end connected to said engagement member and a second end, said second end being movable between first and second locations to move said engagement member into and out of engagement with said engaged member; and
    (ii) drive means operably associated with said drive arm for moving said drive arm between said first and second locations, said drive means comprising:
      a. a helix operably coupled with said end of said drive arm;
      b. motor means for rotating said helix.

13. An apparatus as defined in claim 12 in which said engagement means, when in engagement with said surface of said engaged member, will permit rotation of said engaged member in a first direction but will block rotation thereof in a second direction.

14. An apparatus as defined in claim 12 in which said wheel assembly comprises a generally vertical shaft interconnected with said wheel, said engaged member being connected to said shaft for rotation therewith.

15. An apparatus as defined in claim 14 in which said arm includes first and second end portions and in which said helix includes a plurality of spiral coils, said second end portion of said arm being receivable between adjacent spiral coils.

16. An apparatus as defined in claim 15 in which said first end portion of said arm is connected to said engagement means.

17. An apparatus as defined in claim 16 further including:
   (a) energizing means for energizing said motor means upon receiving a signal; and
   (b) signal-generating means for generating and transmitting a signal to said motor means upon the cart leaving the prescribed area.

18. An apparatus as defined in claim 17 in which said signal generating means comprises a plurality of signal transmitting antennas circumscribing selected portions of the prescribed area.

19. An apparatus as defined in claim 18 further including a low voltage power loop circumscribing the prescribed area, said signal-transmitting antennas being connected to said power loop.

\* \* \* \* \*